United States Patent [19]

Kluger et al.

[11] Patent Number: 4,978,362

[45] Date of Patent: Dec. 18, 1990

[54] THERMOPLASTIC RESIN COMPOSITION CONTAINING POLYALKYLENEOXY-SUBSTITUTED AZO COLORING AGENTS HAVING TRIFLUOROMETHYL SUBSTITUENTS

[75] Inventors: Edward W. Kluger, Pauline; John W. Rekers, Spartanburg, both of S.C.

[73] Assignee: Milliken Research Corporation, Spartanburg, S.C.

[21] Appl. No.: 256,270

[22] Filed: Oct. 11, 1988

Related U.S. Application Data

[63] Continuation of Ser. No. 164,676, Mar. 7, 1988, abandoned, which is a continuation-in-part of Ser. No. 920,961, Oct. 20, 1986, abandoned.

[51] Int. Cl.$^5$ .......................... D06P 3/00; D06P 3/24; D06P 3/79; D06P 5/13
[52] U.S. Cl. ........................................ 18/506; 8/403; 8/508; 8/509; 8/512; 8/513; 8/514; 8/518; 524/83; 524/84; 524/87; 524/88; 524/159; 524/167; 524/190; 524/583; 524/585; 534/729; 534/753; 534/791; 534/844; 534/850; 534/857; 534/858; 534/573
[58] Field of Search ............... 534/729, 857, 858, 791, 534/795, 753, 573 L, 844, 850; 8/506, 403, 508, 509, 512, 513, 514, 518; 524/83, 84, 87, 88, 159, 167, 190, 583, 585

[56] References Cited

U.S. PATENT DOCUMENTS

| | | | |
|---|---|---|---|
| 2,194,927 | 3/1940 | Daudt et al. | 534/858 X |
| 2,258,978 | 10/1941 | Dickey et al. | 534/858 X |
| 2,258,979 | 10/1941 | Dickey et al. | 534/858 X |
| 2,359,305 | 10/1944 | Dickey et al. | 534/858 X |
| 2,432,393 | 12/1947 | Dickey et al. | 534/858 X |
| 2,491,481 | 12/1949 | Dickey | 534/858 X |
| 2,492,172 | 1/1950 | Dickey | 534/858 X |
| 2,590,092 | 3/1952 | Dickey | 534/858 X |
| 2,594,297 | 4/1952 | Dickey | 534/858 X |
| 3,157,633 | 11/1964 | Kuhn | 534/729 |
| 3,449,319 | 6/1969 | Kuhn | 534/729 |
| 3,734,857 | 5/1973 | Moiso et al. | 534/729 X |
| 4,640,690 | 2/1987 | Baumgartner et al. | 8/506 |

FOREIGN PATENT DOCUMENTS

| | | | |
|---|---|---|---|
| 756079 | 8/1956 | United Kingdom | 534/858 |
| 789025 | 1/1958 | United Kingdom | 534/844 |
| 806271 | 12/1958 | United Kingdom | 534/844 |
| 840903 | 7/1960 | United Kingdom | 534/795 |
| 847175 | 9/1960 | United Kingdom | 534/844 |
| 852396 | 10/1960 | United Kingdom | 534/850 |
| 910385 | 11/1962 | United Kingdom | 534/791 |

OTHER PUBLICATIONS

Nishino et al., Chemical Abstracts, vol. 57, 13922a–d, (1963).
Yogupol'suii et al., Chemical Abstracts, vol. 60, 692a–f, (1966).

*Primary Examiner*—Floyd D. Higel
*Attorney, Agent, or Firm*—Timothy J. Monahan; H. William Petry

[57] ABSTRACT

A thermoplastic resin composition is provided which contains a thermoplastic resin and a colorant in the form of a polyalkyleneoxy-trifluoromethyl aniline colorant provided in said thermoplastic resin in a minor amount sufficient to provide coloration to said resin, said colorant having the formula:

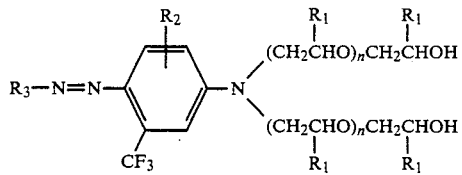

wherein $R_1$ is selected from H, a lower alkyl group containing from 1 to about 10 carbon atoms, $CH_2Cl$, $CH_2Br$, $CH_2OH$, phenyl or

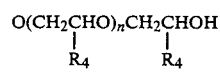

wherein $R_4$ is H or a lower alkyl group containing from 1 to about 9 carbon atoms; $R_2$ is H, $CF_3$, a lower alkyl group containing from 1 to about 9 carbon atoms, Cl or Br; $R_3$ is an aromatic or heteroaromatic containing group, and n is an integer from 2 to about 75.

5 Claims, No Drawings

THERMOPLASTIC RESIN COMPOSITION CONTAINING POLYALKYLENEOXY-SUBSTITUTED AZO COLORING AGENTS HAVING TRIFLUOROMETHYL SUBSTITUENTS

This application is a continuation of copending U.S. patent application Ser. No. 164,676 filed Mar. 7, 1988, now abandoned, which is in turn a continuation-in-part of a copending patent application, U.S. Ser. No. 920,961, filed Oct. 20, 1986 now abandoned.

This invention relates to certain novel monoazo colorants useful in coloring both thermoplastic resins and polyester shaped articles. In addition, this invention further relates to a process both for coloring of thermoplastic resins and polyester shaped articles. More particularly, this invention concerns monoazo colorants containing novel polyalkyleneoxytrifluoromethylaniline coupling components.

It is known that thermoplastic resin compositions may be colored by the addition of dyes or pigments to the resin. Such dyes or pigments are commonly used as dry powders, masterbatches, resin concentrates or dispersions in low molecular weight liquid carriers. Thermoplastic resin compositions which have been colored using pigments in particular may be frequently opaque and may lack the brilliance of color afforded by the use of dyes. Also, considerably more pigment may ordinarily be required to achieve the same tinctorial strength as that which may be obtained with a dye. Use of pigments furthermore may give rise to problems with handling, storage, incorporation, and color blending.

Certain of the deficiencies inherent in pigments, e.g., dullness-of-color, low tinctorial strength, and undesired opacity in certain applications may be overcome by the use of polymer-soluble dyes. Thermoplastic resin compositions which have been colored using polymer-soluble dyes may thus afford products characterized by improved clarity, brilliant colors, and high tinctorial strength. The use of polymer-soluble dyes, however, may lead to dye migration problems and even solvent extraction of the dye from the colored thermoplastic resin. These problems may be particularly acute in low glass transition temperature, flexible resins such as polyethylene, polypropylene, plasticized polyvinyl chloride and other resins of a similar nature (See *Plastics Compounding* 1984/85 Redbook, pp. 50–66; *Modern Plastics Encyclopedia, Colorants*, 1984/85, p. 606). Due to these problems, the use of polymer-soluble dyes may generally not be recommended in such resins and few dyes are in fact recommended by their manufacturers for use in such resin systems.

Attempts have been made to use polymeric dyes in the coloration of thermoplastic resins. These dyes may, however, be difficult to make and may also be difficult to incorporate into thermoplastic resins (as to manufacture of these dyes see U.S. Patent Number 4,477,635 to Mitra, assigned to 3M Corp.).

According to the present invention many of the problems associated with the coloration of thermoplastic resins and many of the deficiencies associated with prior art colored thermoplastic resin products may be obviated or overcome. Thus, as compared to conventional dyes, the coloring agents which are employed according to the present invention typically may exhibit a significantly and surprisingly diminished tendency toward color migration and solvent extraction of the colorant from the thermoplastic resin. These observations are especially noticeable in those resins having a generally low glass transition temperature such as certain polyolefins, polyvinyl chloride and other similar resins. Furthermore, as compared to pigments and possibly even some conventional dyestuffs, improved clarity and tinctorial strength may also be achieved.

Lastly, the coloring agents employed in the thermoplastic resin compositions of the present invention may be provided, if desired, in the liquid phase at ambient conditions of temperature and pressure (although the invention is certainly not limited to liquid phase colorants). Because they may be in the liquid phase, they may provide many processing advantages during actual use, including improved handling, storage, incorporation and color blending.

Accordingly, the present invention provides a colorant of the general formula:

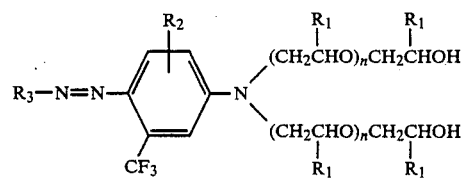

wherein $R_1$ is selected from H, a lower alkyl group containing from 1 to about 10 carbon atoms, $CH_2Cl$, $CH_2Br$, $CH_2OH$, phenyl or

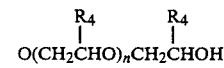

wherein $R_4$ is H or a lower alkyl group containing from 1 to about 9 carbon atoms; $R_2$ is H, $CF_3$, a lower alkyl group containing from 1 to about 9 carbon atoms, Cl or Br; $R_3$ is an aromatic or heteroaromatic containing group, and n is an integer from 2 to about 75.

The present invention also relates to a colored thermoplastic resin composition which comprises a thermoplastic resin and a colorant essentially as described above.

The monoazo compounds are useful in producing yellow to blue shades both in thermoplastic resins and in polyester shaped articles. A further embodiment of this invention is the use of these novel compounds to color thermoplastic resin compositions and a process whereby such compositions are formed.

Thermoplastic resins which may be used according to the present invention include a wide range of synthetic resins and synthetic resin compositions which are known in the art as being essentially thermoplastic in nature. The term "thermoplastic" is used herein in its conventional sense to mean a resin "having the property of softening or fusing when heated and hardening again when cooled" (see *Webster's Seventh Collegiate Dictionary*, G & C Merriam Co., 1965). Thermoplastic resins are to be clearly distinguished both in terms of their essential physical and chemical characteristics from thermosetting resins. The term "thermosetting" as used herein is also used in its conventional sense to mean a resin "having the property of becoming permanently rigid when heated or cured."

Examples of thermoplastic resin systems which may be employed include a wide range of polyolefin polymers, e.g., polyethylene, linear low density polyethylene, polypropylene, polybutylene and copolymers made from ethylene, propylene and/or butylene. Other thermoplastic polymers which may be employed according to the present invention include polyvinyl chloride, polyvinylidene chloride, cellulosic resin such as cellulose acetate, cellulose acetate butyrate and cellulose acetate propionate, acrylic resins such as polymethyl methacrylate, styrene acrylonitrile, polystyrene, polycarbonate and acrylonitrile-butadiene-styrene (herein ABS), polyamides such as nylon 6 and nylon 66 and polyesters such as polyethylene terephthalate, especially glycol modified polyethylene terephthalate and polybutylene terephthalate.

It is to be understood that because the colorants may not ordinarily be chemically bound to the thermoplastic polymer, the precise chemical identity of the end group on the polyalkyleneoxytrifluoromethyaniline may not be critical insofar as the proper functioning of the colorant is concerned in the composition. With this consideration in mind certain most preferred colorants will be defined where certain end groups will be identified. Such recitation of end groups is not to be construed as limiting the invention in its broader embodiments in any way. According to such a most preferred embodiment the colorants may be characterized above.

As mentioned above, the colorants may be employed in the thermoplastic resins in a minor amount sufficient to provide the desired degree of coloration in the resin. The actual amount used will, in addition to the desired depth of shade, depend on the tinctorial strength of the compounds used and the overall molecular weight of the colorant. Typically the amount of colorant employed may be from about 0.0001 percent to about 5 percent, preferably from about 0.001 percent to about 3 percent, by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Any suitable procedure may be employed to produce the colorants of the invention. For example, the procedure set forth in U.S. Pat. No. 3,157,663, hereby incorporated by reference, may be employed. The particular shade of the colorant will depend primarily upon the particular aromatic or heteroaromatic groups selected. A large variety of colors and shades may be obtained by blending two or more colorants. Blending of the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding extrusion, blow-molding and the like. For instance when the thermoplastic resin to be colored is a polyolefin resin the process may be carried out by adding a colorant comprised of a polyalkyleneoxytrifluoromethylaniline-substituted colorant directly to the molten polymer, by tumbling it onto a pre-extruded pelletized resin, or by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first be prepared. Such concentrate may contain an appropriately high percentage of colorant. The concentrates may be in the form of liquids, solids, e.g., powders, pellets, etc., as may be desired. These concentrates may then be incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in the solvent-free form rather than in the form of solutions or dispersions in a suitable solvent or dispersing medium. Obviously liquids may have certain processing advantages over solids; and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of a solvent or dispersing agent which is compatible with the resin, thus providing certain processing advantages.

Another embodiment of the present invention relates to the coloration of polyester shaped articles and a process for coloring polyester shaped articles having improved exhaustion and lightfastness properties to mention but a few.

A variety of processes have been developed for the coloration of polyester resins and polyester articles with organic dyestuffs. These include coloration during melt processing, e.g., during fiber spinning or melt compounding; coloration by exhaustion from aqueous or organic solution or dispersions, e.g., jet dyeing; and thermofixation of dyestuffs at high temperature onto preformed polyester articles, especially fibers and fabrics, e.g., the "thermosol" process.

The colored polyester resins and articles prepared by the above processes may suffer from certain deficiencies because the colorants are generally only physical mixtures dissolved in the polyester resin. Therefore, during subsequent processing or during use of the polyester article, the colorants may tend to migrate and become extracted or leached. This is a particular problem with colored polyester fabrics in which dye migration problems are manifested by decreased colorfastness to laundering and dry cleaning, as well as color transfer by rubbing (crocking).

In addition, colored polyester fabrics in contact with organic polymer substrates (such as a polyvinylchloride laminate) tend to exhibit bleeding of the colorant to the substrate, particularly if the polymer substrate contains a plasticizer. Also, molded polyester articles (such as beverage containers) may show undesirable leaching of the colorant into the beverage product.

Attempts have been made to overcome these difficulties by the use of insoluble dyes or pigments which are incorporated into the polyester resin during melt compounding. Although improved migration properties are often obtained, the colored articles may be opaque and lack of brilliance of color afforded by soluble dyestuffs. Also, considerably more pigment may ordinarily be required to achieve the same depth of shade as that which may be obtained with a dye. Furthermore, use of pigments and insoluble dyes may give rise to problems with handling, storage, incorporation, and color blending.

According to the present invention many of the problems associated with the coloration of polyester resins and many of the deficiencies associated with colored polyester resin products may be obviated or overcome. Thus, as compared to conventional colorants and coloration processes, the coloring agents employed in the process of the present invention are substantially bonded or grafted to a preformed polyester resin, and therefore are considerably less or even completely non-extractable, non-leachable, and non-migrating. Polyester resin shaped articles colored by this process show generally improved colorfastness as compared to conventionally colored articles, to laundering, dry cleaning, and rubbing and show less color bleeding into other polymer substrates than conventionally colored polyester articles. Molded polyester articles colored by the process of the present invention show similar useful improvements in color substantivity.

Thus, the present invention provides a process by which certain coloring agents can be partially or completely grafted to a preformed polyester resin so that the color is substantially or completely a part of the polymer product. As compared to conventional dyes, the coloring agents which are employed in the process of the present invention typically may exhibit a significantly and surprisingly diminished tendency toward dye migration, even when not grafted to the polyester resin. The process of the present invention provides methodology for a further significant improvement in dye migration properties when the coloring agents are partially reacted with the polyester resin, or, for complete non-migration properties, when the coloring agents are virtually completely reacted with the polyester resin.

A process is provided for the coloration of the preformed polyester resin shaped article having improved dye migration properties, which comprises: (a) coloring said article with a coloring agent in an amount sufficient to provide coloration to said shaped article; said coloring agent having the formula:

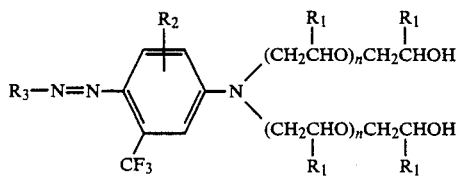

wherein $R_1$ is selected from H, a lower alkyl group containing from 1 to about 10 carbon atoms, $CH_2Cl$, $CH_2Br$, $CH_2OH$, phenyl or

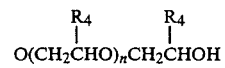

wherein $R_4$ is H or a lower alkyl group containing from 1 to about 9 carbon atoms, $R_2$ is H, $CF_3$, a lower alkyl group containing from 1 to about 9 carbon atoms, Cl or Br; $R_3$ is an aromatic or heteroaromatic containing group, and n is an integer from 2 to about 75, and (b) grafting said coloring agent to said article by heating said article to temperature below a temperature at which said article will melt, but to a high enough temperature and for a period of time sufficient to achieve grafting of said coloring agents to said article.

The polyester resins which may be used in the process of the present invention include a wide range of synthetic resins. The term "polyester" as used in this specification refers to synthetic polymers and copolymers which contain at least one ester or ester precursor functionality per monomer unit and in which said monomer unit is at least about 5% to about 100% of the total weight of the polymer, preferably about 25% to about 100% of the total weight. The general criterion is that there be a sufficient number of ester groups within the polymer so that the grafting of the colorant may occur to obtain a useful depth of shade of the bound colorant.

Preferred polyester resins include those which are produced by condensation of a difunctional acid or ester with a difunctional alcohol, such as polyethylene terephthalate, polybutylene terephthalate and glycol modified polyethylene terephthalate. Most preferred are fiber forming polyesters such as polyethylene terephthalate. It is also envisioned that blends of a polyester resin with another resin may be colored by the process of the present invention.

As mentioned above, the polyester resins are provided with partially or essentially completely non-extractable coloration. The colorants useful in the process of the present invention may be most broadly described as polyalkyleneoxytrifluoromethylaniline colorants. The aromatic or heteroaromatic groups of the colorant may vary widely, and may include compounds characterized in the art as dyestuffs or as pigments. The actual group used will depend to a large extent upon, for instance, the color or colorfastness characteristics desired in the colored polyester resin or article.

The trifluoromethylaniline coupler of the colorants employed in the process of the present invention is substituted with one or more polyalkyleneoxy groups. It is believed that these groups provide the point of attachment of the colorant to the polyester, possibly by a condensation reaction between the polymer and colorant during the process. This mechanism is suggested only as a plausible explanation for the observed result of non-extractable color, and should not be construed as a limitation on the process. Other possible mechanisms include reaction of the colorant and polymer through peroxides formed on the polyalkyleneoxy group or on the polyester, or through activated end groups formed by depolymerization of the polyalkyleneoxy group. Typical polyalkyleneoxy groups which may be attached to the chromophore radical are the polymeric epoxides, such as the polyalkylene oxides and copolymers thereof. Typical polyalkylene oxides and copolymers of same which may be employed to provide colorants useful in the process of the present invention include those made from alkylene oxide monomers containing from one to about four carbon atoms. Examples include polyethylene oxides, polypropylene oxides and polybutylene oxides, and other copolymers including block copolymers, in which a majority of the polymeric substituent is polyethylene oxide, polypropylene oxides and/or polybutylene oxide.

The average molecular weight of the polyalkyleneoxy, substituent on the trifluoromethylaniline coupler may be important in the process of the present invention. Generally, higher molecular weight substituents may be less compatible with the polyester resin. This may be of importance in non-melt coloration dyeing methods (e.g., dyeing from an aqueous bath). On the other hand, greater reactivity in the grafting process may occur with higher molecular weight polyalkyleneoxy substituents. In addition, advantageous physical properties of the colorant, such as fluidity, water solubility or decreased volatility may be obtained with higher molecular weight substituents. Generally, the polyalkyleneoxy substituents may have an average molecular weight of from about 132 to about 11,000, preferably from about 176 to about 2,000, most preferably from about 220 to about 1,200.

The number of polyalkyleneoxy groups substituted on the chromophore radical may have an effect on the reactivity of the colorant to grafting using the process of the present invention. Usually from 1 to about 12 polyalkyleneoxy substituent groups are preferred, from about 2 to about 6 are more preferred, and from 2 to about 4 are most preferred.

The polyalkylenoxy groups substituted on the trifluoroaniline coupler are terminated with groups which do not significantly interfere with and may enhance the grafting of the colorant to the polyester resin. Preferable end groups include hydroxyl, amine, amino, mercaptan, ester, carboxylic, acid, carboxylate, carbonate, sulfate, sulfonate phosphate, phosphonite, urea, urethane, alkoxyl and alkoxide. More preferable end groups include hydroxyl, amine, and urethane; hydroxyl is most preferred. It may be advantageous to maximize grafting of the colorant without undesirable side effects by employing more than one of the preferred end groups in the colorant, such as hydroxyl and sulfonic acid.

Other conventional additives may also be present in the polyester resins colored by the process of the present invention. For instance, such additives may include plasticizers, antioxidants, stabilizers, lubricants, nucleating agents and other additives which will be readily identified by those skilled in the art. In general, the colorants have been observed to have little or no adverse interactions with these conventional additives.

Any suitable procedure may be employed to produce the colorants of the invention whereby the polymeric constituent, or constituents, are coupled to an organic dyestuff radical. For example, the procedure set forth in U.S. Pat. No. 3,157,663, hereby incorporated by reference, may be employed. The particular shade of the colorant will depend primarily upon the particular chromophore group selected. A large variety of colors and shades may be obtained by blending two or more colorants. Blending of the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the present invention, the colorants are incorporated into the polyester resin or article using essentially conventional coloration or dyeing techniques. These would include incorporation during melt compounding by mixing the colorant with the polyester resin by extrusion, calendaring, molding, or the like. It is particularly convenient to incorporate the colorants into formed polyester articles, such as fiber or fabric, by exhaustion from a dye bath. Suitable temperatures for exhaustion depend on the colorant structure and the composition of the dye liquor. From aqueous dye liquors, exhaustion may be effected at temperature from about 50° C to 150° C. Lower temperatures may be suitable for liquor containing carriers or organic solvents.

It has been found that it is especially convenient to incorporate the colorant into polyester textile articles using a so-called thermosol, or thermofixation process. In this variation, the colorant is applied primarily to the surface of the polyester from a solution or dispersion. Aqueous solutions are especially convenient. The polyester article is subsequently dried and heated to cause penetration of the colorant into the resin. Suitable temperatures to effect colorant penetration depend on the structure and amount of colorant, as well as the type of polyester article. Typically, temperature of about 125° C to about 250° C are appropriate, preferably about 175° C to about 235° C, most preferably about 190° C to about 225° C. Treatment times may generally be in the range of about 15 seconds to about 15 minutes, preferably about 1 to 5 minutes.

It may be advantageous to incorporate other ingredients into the colorant or dye liquor to improve the coloration process or colorfastness characteristics. These may include stabilizers, UV absorbers, antioxidants, peroxide decomposers, nucleating agents, thixotropes, wetting agents, antimigratory agents, carriers, levelers, organic or inorganic salts, and the like. Such ingredients are well known to those skilled in the art.

According to the process of the present invention, grafting of the colorants (that is, the process by which the colorants become non-extractable) is effected either concurrent or subsequent to the dye incorporation process. Generally, conventional coloration processes are not sufficient to cause substantial or complete grafting of the colorant, although modifications of conventional processes employing the methodology disclosed herein may be used to effect substantial or complete grafting.

By substantial grafting it is meant that the level of non-extractable colorant as a percent of the total colorant is sufficient to impart beneficial migration properties to the polyester article beyond that which would be obtained from the ungrafted colorants. Generally, a minimum of at least 25% to about 75% of the incorporated colorant should be grafted to obtain such an improvement. By complete grafting it is meant that the colorant has become essentially completely non-migrating and non-extractable from the polyester article. Generally, at least 75% to about 100% of the incorporated colorant should be grafted to obtain these properties.

According to the process of the invention, substantial or complete grafting of the colorants is effected by subjecting the polyester article or resin containing the colorants to thermal energy or actinic radiation. The extent of grafting in the process is essentially a time and energy input related phenomenon. For example, substantial or complete grafting of the colorants to a polyester fiber or fabric can be effected at temperatures as slow as about 120° C to about 150° C in a period of about 4 to 48 hours. Substantial or complete grafting may be obtained much more quickly at higher temperatures, for example, at about 175° C to about 200° C. in about 30 minutes to 14 hours, or at about 200° C to about 250° C in less than 30 seconds to about 3 hours. The thermal conditions selected to effect grafting will depend on the concentration and structure of the colorant, the desired level of non-migration characteristics, and the thermal stability constraints dictated by the type of polyester resin or article being treated by the process.

It has been found to be particularly convenient in the case of polyester textiles and fibers to effect the grafting process concurrent to the colorant incorporation process. Thus, for example, the colorant may be incorporated into the polyester article by a thermal process using temperatures and processing times moderately greater than those conventionally used (under the constraints described above) and thereby obtain substantial or complete grafting of the colorant. Such a process may be continuous, batch, or a combination of the two.

It may also be convenient in the case of polyester textile and fiber to incorporate the colorants by a conventional bath dyeing procedure (e.g., jet dyeing) and subsequently graft the colorants using the procedures described above.

Methods of energy input other than thermal processing may also be used to effect grafting. Actinic radiation, especially microwave or infrared radiation, has been found to be useful in this regard.

Examples 6 and 9 illustrate the coloration of thermoplastic resin compositions and a process whereby such compositions are formed.

Examples 7 through 9 illustrate the coloration of polyester resin shaped products and a process whereby such compositions are formed.

The examples are not to be construed as limiting the invention which is defined in the claims appended hereto. Unless otherwise indicated all parts and percentages are by weight.

INTRODUCTION TO EXAMPLES

The diazo compounds, the preparation of which is set forth in Examples 1 through 4 and the structures of which are shown in Tables 1 through 4, fall into four main categories of compounds, the general structures of which are set forth below along with corresponding Example numbers and Table numbers:

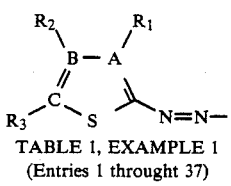

TABLE 1, EXAMPLE 1
(Entries 1 throught 37)

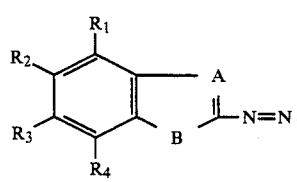

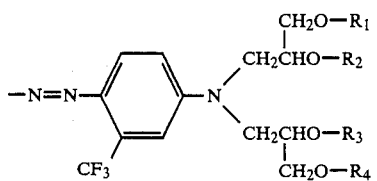

TABLE 2, EXAMPLE 2
(Entries 1 through 27)

TABLE 3, EXAMPLE 3
(Entries 1 through 7)

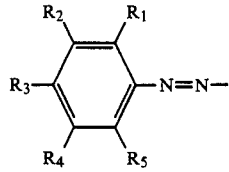

TABLE 4, EXAMPLE 4
(Entries 1 through 35)

EXAMPLE 1

Two hundred grams of 85% phosphoric acid, 25 grams of 98% sulfuric acid, and 4 drops of 2-ethylhexanol were added to a 500 cc flask, after which the mixture was cooled and 16.4 grams of 2-amino-4-methyl-2.5-dicyanothiophene was added to the flask. The mixture was then further cooled to below 0° C after which 38 grams of 40% nitrosyl sulfuric acid were added while maintaining the temperature below 0° C. After three hours the mixture gave a positive nitrite test and 2 grams of sulfamic acid was added and a vacuum pulled. A negative nitrite test was evident after one further hour.

A 2,000 cc beaker was charged with 63.1 grams of m-trifluoromethylaniline 10EO, 200 grams of ice-water and 4 grams of urea. This mixture was cooled to below 0° C. The diazo solution from the flask was added dropwise to the beaker over about 30 minutes, maintaining the temperature below 10° C. The resulting mixture was stirred for several hours and allowed to stand overnight, after which 244 grams of sodium hydroxide (50%) was added to neutralize excess acid to a pH of about 7. The resulting product was then dissolved in methylene chloride, washed four times and then dried over magnesium sulfate. The methylene chloride solution was then filtered and stripped to yield a violet oil. The structure for the resultant compound is set forth in Entry 1 of Table 1 below. A wide variety of related compounds were prepared using the same general procedure set forth in Example 1 and are represented by Entries 2 through 37 of Table 1.

The following abbreviations are utilized in the following tables: EO=ethylene oxide; PO=propylene oxide. Also where numbers are separated by diagonals, e.g., 2/15/5, such refers to moles EO/ moles PO/ moles EO. Unless otherwise indicated, the polyalkyleneoxy groups are hydroxyl terminated.

TABLE 1

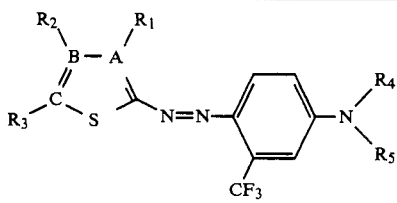

| ENTRY # | A | A | B | $R_1$ | $R_2$ | $R_3$ | $R_4R_5$ |
|---|---|---|---|---|---|---|---|
| 1 | C | C | C | CN | $CH_3$ | CN | 10EO |
| 2 | C | C | C | CN | $CH_3$ | CN | 11EO |
| 3 | C | C | C | CN | $CH_3$ | CN | 12EO |
| 4 | C | C | C | CN | $CH_3$ | CN | 2EO |
| 5 | C | C | C | CN | $CH_3$ | CN | 20EO |
| 6 | C | C | C | CN | $CH_3$ | CN | 22.5EO |
| 7 | C | C | C | CN | $CH_3$ | CN | 25EO |
| 8 | C | C | C | CN | $CH_3$ | CN | 27.5EO |
| 9 | C | C | C | CN | $CH_3$ | CN | 30EO |
| 10 | C | C | C | CN | $CH_3$ | CN | 2EO/10PO/6EO |
| 11 | C | C | C | $CO_2CH_3$ | $CH_3$ | $CO_2CH_3$ | 10EO |
| 12 | C | C | C | $CO_2C_2H_5$ | $CH_3$ | $CO_2C_2H_5$ | 10EO |
| 13 | C | C | C | $CO_2CH_3$ | $CH_3$ | $CO_2C_2H_5$ | 10EO |
| 14 | C | C | C | $CO_2C_2H_5$ | $CH_3$ | CN | 10EO |
| 15 | C | C | C | CN | $CH_3$ | $CO_2C_2H_5$ | 10EO |
| 16 | C | C | C | $COCH_3$ | $CH_3$ | $CO_2C_2H_5$ | 10EO |
| 17 | C | C | C | $CO_2C_2H_5$ | $CH_3$ | $CONHC_6H_5$ | 10EO |
| 18 | C | C | C | $CO_2C_2H_5$ | H | $C_6H_5$ | 10EO |
| 19 | C | C | C | CN | —$(CH_2)_2$— | | 10EO |
| 20 | C | C | C | $CO_2C_2H_5$ | —$(CH_2)_4$— | | 10EO |
| 21 | C | C | C | CN | $CH_3$ | CN | 2EO |
| 22 | C | C | C | CN | —$(CH_2)_4$— | | 2EO |
| 23 | C | C | C | $CO_2C_2H_5$ | $CH_3$ | $CO_2C_2H_5$ | 2EO |
| 24 | C | C | C | $CO_2CH_3$ | $CH_3$ | $CO_2CH_3$ | 2EO |
| 25 | C | C | C | $CO_2C_2H_5$ | —$(CH_2)_4$— | | 2EO |
| 26 | C | C | C | $CO_2CH_3$ | H | $COCH(CH_3)_2$ | 2EO |
| 27 | C | C | C | $CO_2NHC_2H_5OH$ | H | $COCH(CH_3)_2$ | 2EO |
| 28 | C | C | C | CN | $CH_3$ | $CH_3$ | 10EO |
| 29 | N | C | C | — | H | H | 10EO |
| 30 | N | C | C | — | $CH_3$ | H | 10EO |
| 31 | N | C | C | — | $C_6H_5$ | H | 10EO |
| 32 | N | C | C | — | H | $NO_2$ | 10EO |
| 33 | N | C | N | — | $C_6H_5$ | — | 2EO/10PO/6EO |
| 34 | N | C | N | — | $C_2H_5$ | — | 10EO |
| 35 | N | C | N | — | $C_6H_5$ | — | 2EO |
| 36 | N | N | C | — | — | $SC_2H_5$ | 10EO |
| 37 | N | N | C | — | — | $C_2H_5$ | 10EO |

EXAMPLE 2

The procedure of example 1 was followed with the exception of amounts of reactants and the particular diazo component and coupler employed, all of which are specified below:
549 grams of 85% phosphoric acid
150 grams of 98% sulfuric acid
3 drops of 2-ethyl hexanol defoamer
49.2 grams of 4-methyl-2-aminobenzothiazole
105 grams of 40% nitrosyl sulfuric acid
9 grams of sulfamic acid
189 grams of m-trifluoromethylaniline -10EO
200 grams of ice
200 grams of water
12 grams urea The excess acid was neutralized with 780 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield an orange oil.

The structure for the product compound is set forth in Entry 1 of Table 2 below. A wide variety of related compounds were prepared using the same general procedure set forth in Example 2 and are represented by Entries 2 through 27 of Table 2.

TABLE 2

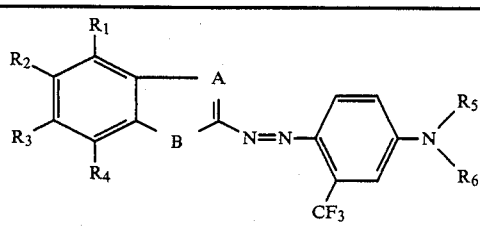

| Entry # | A | B | $R_1$ | $R_2$ | $R_3$ | $R_4$ | $R_5R_6$ |
|---|---|---|---|---|---|---|---|
| 1 | N | S | $CH_3$ | H | H | H | 10EO |
| 2 | N | S | $CH_3$ | H | H | H | 2EO/10PO/6EO |
| 3 | N | S | Cl | H | H | H | 20EO |
| 4 | N | S | Cl | H | H | H | 2EO/10PO/6EO |
| 5 | N | S | Cl | H | H | H | 2EO/15PO/5EO |
| 6 | N | S | Cl | H | H | H | 10EO |
| 7 | N | S | Cl | H | H | H | 22.5EO |
| 8 | N | S | Cl | H | H | H | 25EO |
| 9 | N | S | Cl | H | H | H | 27.5EO |
| 10 | N | S | Cl | H | H | H | 30EO |
| 11 | N | S | Cl | H | H | H | 2EO |
| 12 | N | S | H | H | H | H | 10EO |
| 13 | N | S | H | H | H | H | 20EO |
| 14 | N | S | H | H | H | H | 2EO |
| 15 | N | S | H | H | H | H | 2EO/10PO/6EO |
| 16 | N | S | H | H | $NO_2$ | H | 10EO |
| 17 | N | S | Br | H | $NO_2$ | H | 10EO |
| 18 | N | S | $CH_3$ | H | Br | H | 2EO/10PO/6EO |
| 19 | N | S | Br | H | $OCH_3$ | H | 2EO/10PO/6EO |
| 20 | N | S | Br | H | Cl | H | 2EO/10PO/6EO |
| 21 | N | S | Br | H(Cl) | Cl | H(Cl) | 2EO/10PO/6EO |
| 22 | N | S | Cl | H | Cl | H | 2EO/10PO/6EO |
| 23 | N | S | H | H | $SO_2CH_3$ | H | 2EO/10PO/6EO |
| 24 | N | S | Br | H | $SO_2CH_3$ | H | 2EO/10PO/6EO |
| 25 | N | S | H | H | $CH_3$ | H | 2EO/10PO/6EO |
| 26 | N | S | H | H | $OCH_3$ | H | 2EO/10PO/6EO |
| 27 | $CCO_2C_2H_5$ | S | H | H | H | H | 2EO/15PO/5EO |

EXAMPLE 3

The procedure of Example 1 was followed with the exception of amount of reactants and the particular diazo component and coupler employed, all of which are specified below:

200 grams of 85% phosphoric acid
25 grams of 98% sulfuric acid
4 drops of 2-ethylhexanol defoamer
16.4 grams of 2-amino-4-methyl-2,5-dicyanothiophene
38 grams of 4% nitrosyl sulfuric acid
2 grams of sulfamic acid
78 grams of m-trifluoromethylaniline 2PDO/10EO
80 grams of ice
80 grams of water
8 grams of urea The excess acid was neutralized with 244 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield a violet oil.

The structure for the product compound is set forth in Entry 1 of Table 3 below. A wide variety of related compounds were prepared using the same general procedure set forth in Example 3 and are represented in Entries 2 through 7 of Table 3.

TABLE 3

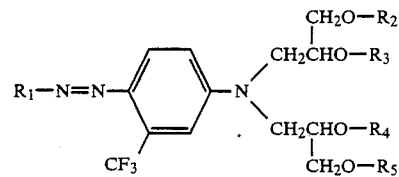

| Entry # | R1 | R2,R3,R4,R5 | Color |
|---|---|---|---|
| 1 | $CH_3$, CN, NC, S (thiophene) | 10EO | Violet |
| 2 | $CH_3$, CN, NC, S (thiophene) | 11EO | Violet |
| 3 | $CH_3$, CN, NC, S (thiophene) | 12EO | Violet |
| 4 | $NO_2$-phenyl-CN | 10EO | Violet |

TABLE 3-continued

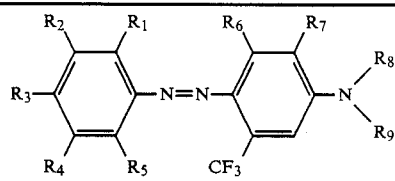

| Entry # | R1 | R2,R3,R4,R5 | Color |
|---|---|---|---|
| 5 | (2-Cl, 6-thio-isopropyl phenyl) | 10EO | Red |
| 6 | (2-Cl, 4-NO2 phenyl) | 10EO | Red |
| 7 | (2-Cl, 4-NO2, 6-Cl phenyl) | 10EO | Orangish-Brown |

EXAMPLE 4

The procedure of Example 1 was followed with exception of amounts of reactants and the particular diazo component and coupler employed, all of which are specified below:
450 grams of ice
210 grams of 70% sulfuric acid
9 drops of 2-ethylhexanol defoamer
51.9 grams of 2-chloro-4-nitroaniline
129 grams of 40% nitrosyl sulfuric acid
9 grams of sulfamic acid
378 grams of m-trifluoromethylaniline 20EO
400 grams of ice water
12 grams of urea The excess acid was neutralized with 435 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield a red oil.

The structure for the resultant component is set forth in Entry 1 of Table 4 below. A wide variety of related compounds were prepared using the same general procedure set forth in Example 4 and are represented by Entries 2 through 35 of Table 4.

TABLE 4

Structure: Substituted diphenyl azo compound with $R_1, R_2, R_3, R_4, R_5$ on one ring, $-N=N-$, and $R_6, R_7, CF_3, N(R_8)(R_9)$ on the other ring.

| Entry # | $R_1$ | $R_2$ | $R_3$ | $R_4$ | $R_5$ | $R_6$ | $R_7$ | $R_8R_9$ |
|---|---|---|---|---|---|---|---|---|
| 1 | Cl | H | $NO_2$ | H | H | H | H | 20EO |
| 2 | Cl | H | $NO_2$ | H | H | H | H | 10EO |
| 3 | Cl | H | $NO_2$ | H | H | H | H | 22.5EO |
| 4 | Cl | H | $NO_2$ | H | H | H | H | 25EO |
| 5 | Cl | H | $NO_2$ | H | H | H | H | 27.5EO |
| 6 | Cl | H | $NO_2$ | H | H | H | H | 30EO |
| 7 | CN | H | $NO_2$ | H | H | H | H | 10EO |
| 8 | CN | H | $NO_2$ | H | H | H | H | 20EO |
| 9 | CN | H | $NO_2$ | H | H | H | H | 22.5EO |
| 10 | CN | H | $NO_2$ | H | H | H | H | 25EO |
| 11 | CN | H | $NO_2$ | H | H | H | H | 27.5EO |
| 12 | CN | H | $NO_2$ | H | H | H | H | 30EO |
| 13 | Cl | H | $SO_2CH_3$ | H | H | H | H | 10EO |
| 14 | Cl | H | $SO_2CH_3$ | H | H | H | H | 11EO |
| 15 | Cl | H | $SO_2CH_3$ | H | H | H | H | 12EO |
| 16 | H | H | $NO_2$ | H | H | H | H | 10EO |
| 17 | Cl | H | $NO_2$ | H | Cl | H | H | 10EO |
| 18 | Cl | H | $NO_2$ | H | Cl | H | H | 11EO |
| 19 | Cl | H | $NO_2$ | H | Cl | H | H | 12EO |
| 20 | CN | H | $NO_2$ | H | Br | H | H | 10EO |
| 21 | $NO_2$ | H | $NO_2$ | H | Br | H | H | 10EO |
| 22 | Cl | H | $SO_2CH_3$ | H | H | H | Cl | 10EO |
| 23 | $CF_3$ | H | Cl | H | H | H | Cl | 10EO |
| 24 | Cl | H | H | $CF_3$ | H | H | H | 10EO |
| 25 | H | H | $SO_2N(C_2H_4OH)_2$ | H | H | H | H | 10EO |
| 26 | Cl | H | H | $NO_2$ | H | H | H | 10EO |
| 27 | CN | H | $NO_2$ | H | CN | H | H | 10EO |
| 28 | H | H | $CH_3$ | $SO_2-N-C_2H_5$ $C_6H_5$ | H | H | H | 12EO |
| 29 | OH | H | H | $CH_3$ | H | H | H | 10EO |
| 30 | OH | H | H | $CH_3$ | H | H | H | 11EO |
| 31 | Cl | H | H | H | Cl | H | H | 10EO |
| 32 | Cl | H | H | H | Cl | H | H | 11EO |

TABLE 4-continued

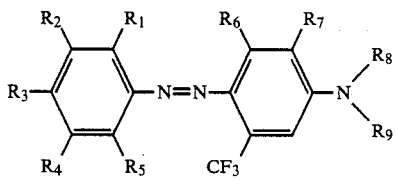

| Entry # | $R_1$ | $R_2$ | $R_3$ | $R_4$ | $R_5$ | $R_6$ | $R_7$ | $R_8R_9$ |
|---|---|---|---|---|---|---|---|---|
| 33 | Cl | H | Cl | H | Cl | H | H | 11EO |
| 34 | Cl | H | $SO_2CH_3$ | H | H | H | Cl | 12EO |
| 35 | Cl | H | H | H | Cl | H | Cl | 12EO |

EXAMPLE 5

The procedure of Example 1 was followed with the exception of amount of reactants and the particular diazo component and coupler employed, all of which are specified below:
450 grams of ice
210 grams of 70% sulfuric acid
9 drops of 2-ethylhexanol defoamer
51.9 grams of 2-chloro-4-nitroaniline
51.9 grams of 40% nitrosyl sulfuric acid
9 grams of sulfamic acid
306.5 grams of aniline 20EO
600 grams of ice water
12 grams of urea The excess acid was neutralized with 435 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield a red oil.

The structure for the resultant component is set forth in Entry 1 of Table 5 below.

A variety of additional compounds were prepared using exactly the same procedure and the structures for these compounds are summarized in Tables 5 and 6.

TABLE 5
COMPARATIVE COLORANTS

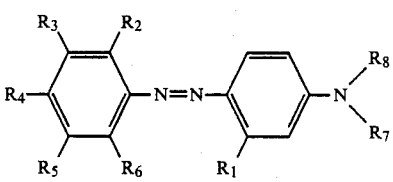

| Entry # | $R_1$ | $R_2$ | $R_3$ | $R_4$ | $R_5$ | $R_6$ | $R_7R_8$ |
|---|---|---|---|---|---|---|---|
| 1 | H | Cl | H | $NO_2$ | H | H | 20EO |
| 2 | H | Cl | H | $NO_2$ | H | H | 2EO/15PO/5EO |
| 3 | H | Cl | H | $NO_2$ | H | H | 10EO |
| 4 | Cl | Cl | H | $NO_2$ | H | H | 10EO |
| 5 | $CH_3$ | Cl | H | $NO_2$ | H | H | 10EO |
| 6 | $CH_3$ | H | H | $NO_2$ | H | H | 10EO |
| 7 | Cl | H | H | $NO_2$ | H | H | 10EO |
| 8 | $CH_3$ | CN | H | $NO_2$ | H | H | 10EO |
| 9 | H | CN | H | $NO_2$ | H | H | 10EO |
| 10 | H | Cl | H | $SO_2CH_3$ | H | H | 10EO |
| 11 | H | Cl | H | $NO_2$ | H | Cl | 10EO |

TABLE 6
COMPARATIVE COLORANTS

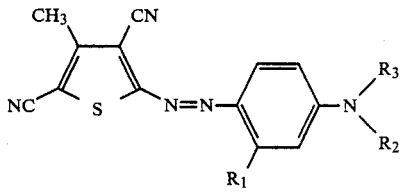

| Entry # | $R_1$ | $R_2R_3$ |
|---|---|---|
| 1 | $CH_3$ | 10EO |
| 2 | Cl | 10EO |

EXAMPLE 6

Conventional polymeric colorants of Example 5 were compared with the compounds of the present invention for extractability of the colorants from polypropylene homopolymer, a common commercial thermoplastic resin. The following procedure was followed.

First the color value of the colorants to be tested was determined using the procedure detailed in Example Number 9 of U.S. Pat. No. 4,507,407 (incorporated by reference). In order to correct for differences in color strength among the colorants, the weight of each colorant used was adjusted according to its color value by use of the following formula:

22.9/color value = weight used

The proper weight of the colorant to be tested was added to 1,000 grams of Profax polypropylene homopolymer flake (Himont, Inc.,). The mixture was then drum tumbled for 20 minutes to ensure uniform colorant distribution over the surface of the polymer flake. In cases where the colorant was a solid or semi-solid, it was first dissolved in the minimum amount of methanol necessary to produce a uniform solution and was then added to the resin. The colored pellets were then injection molded into 3 inch by 2 inch plaques with a bi-level thickness of 50 mils and 85 mils.

Five plaques were then placed in a glass jar and boiling 95% ethanol was added, followed by slow cooling to ambient conditions over 2 hours. The extracts were then each concentrated to a volume of 25 milliliters and the absorbance of the extracts was determined using a Beckman DU-7 spectrometer. The spectrometer was zeroed using the extract from the uncolored plaques and the maximum absorbance between 400 and 700 nanometers was recorded. The amount of colorant extracted (ppb/in².ml) was then calculated using the following formula:

$$\text{ppb/in}^2/\text{ml} = \frac{\left(\frac{A}{L}\right)(V)}{(CV)(SA)} \times 10^8$$

where A is absorbance, L is cell length in Centimeters, CV is color value, V is volume of concentrated extraction solvent in liters and SA is the surface area of the plaques extracted in square inches.

Table 5, Entries 1 through 4 demonstrates the effect of the colorant composition and non-extractability of the polymeric colorants.

TABLE 6

COMPARATIVE EXTRACTION DATA FOR POLYPROPYLENE HOMOPOLYMER

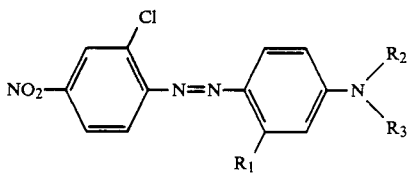

| Entry # | $R_1$ | $R_2\ R_3$ | % Conc. in PP* | ppb Extracted** |
|---|---|---|---|---|
| 1 | H | 20EO | 0.53 | 104 |
| 2 | $CF_3$ | 20EO | 0.50 | 52 |
| 3 | H | 2EO/15PO/5EO | 0.54 | 80 |
| 4 | $CF_3$ | 2EO/15PO/5EO | 0.60 | 50 |

*Concentration in polyproylene homopolymer at equivalent color strength formulations.
**ppb — parts per billion of colorant extracted per in²ml.

EXAMPLE 7

This example illustrates the method by which the novel compounds of this invention along with some conventional polymeric colorants are incorporated and grafted into polyester fabrics.

Solutions (0.5% by weight) of the colorants were prepared in water, methanol, or acetone, and padded onto a 100% polyester woven fabric. Excess dye liquor was removed by squeezing to give about 80% wet pick up. The fabrics were heated in a forced air oven at 190-210° C. for 15 minutes. A small swatch of each of the dyed fabrics was rinsed with methanol to remove surface dye, and the level of colorant penetration (or exhaustion) was rated visually on a scale of 1.0 to 5.0 by comparing the rinsed and unrinsed samples (1.0 = slight dye penetration, 5.0 = nearly quantitative dye penetration). The results are shown in Table 7, Entries 1 through 4.

TABLE 7

COMPARATIVE EXHAUSTION DATA FOR POLYESTER FABRIC

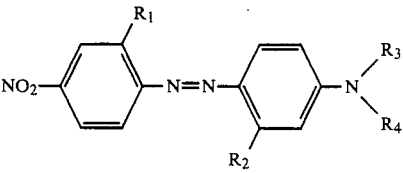

| Entry # | $R_1$ | $R_2$ | $R_3R_4$ | EXHAUSTION RATE |
|---|---|---|---|---|
| 1 | CN | $CH_3$ | 10EO | 4.0 |
| 2 | CN | $CF_3$ | 10EO | 5.0 |
| 3 | H | $CH_3$ | 10EO | 4.0 |
| 4 | H | $CF_3$ | 10EO | 4.5 |

EXAMPLE 8

A small swatch of each of the polyester fabrics obtained from Example 7 was rinsed with methyl alcohol and was then extracted with hot dimethyl formamide at 100° C for one hour. The dimethylformamide solutions were all virtually colorless indicating that the colorant were not extractable.

EXAMPLE 9

The conventional polymeric colorants of Tables 5 and 6 were also studied in order to provide a side by side comparison of lightfastness of conventional polymeric solvents against the novel compounds of this invention. The colorants were incorporated in polypropylene homopolymer and bound to polyester fabric according to the procedures given in Examples 6 and 7 given above. The colored test samples (polypropylene or polyester fabric) were then mounted in holders which were covered on both sides after which 2 inch² areas were exposed to cycles of 20, 40, 60 or 120 hours in a water-cooled xenon-arc lamp fading apparatus. The apparatus was controlled at 63° Centigrade plus or minus 1° while relative humidity was controlled at 30 percent plus or minus 5 percent.

The colorants for thermoplastic lightness results are summarized in Tables 8 and 9 while the results of the polyester bound colorants are summarized in Table 10.

TABLE 8

COMPARATIVE LIGHTFASTNESS DATA FOR POLYPROPYLENE HOMOPOLYMER*

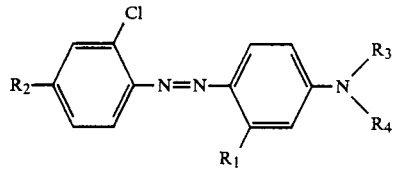

| | | | | Light Fastness Rating** | | |
|---|---|---|---|---|---|---|
| Entry # | $R_1$ | $R_2$ | $R_3R_4$ | 20 HRS. | 60 HRS | 120 HRS |
| 1 | H | $SO_2CH_3$ | 10 | 4.3 | 3.3 | — |
| 2 | $CF_3$ | $SO_2CH_3$ | 10 | — | 4.2 | 3.2 |
| 3 | H | $NO_2$ | 10 | — | 4.1 | 2.8 |
| 4 | Cl | $NO_2$ | 10 | — | 3.7 | 2.8 |

TABLE 8-continued
COMPARATIVE LIGHTFASTNESS DATA FOR POLYPROPYLENE HOMOPOLYMER*

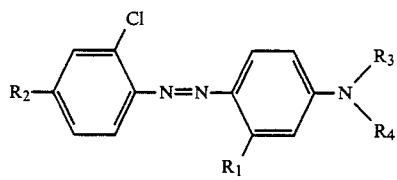

| | | | Light Fastness Rating** | | |
|---|---|---|---|---|---|
| Entry # | R$_1$ | R$_2$ | R$_3$R$_4$ 20 HRS. | 60 HRS | 120 HRS |
| 5 | CF$_3$ | NO$_2$ | 10 | 4.5 | 3.2 |

*Polypropylene homopolymer base formulation: 0.1% calcium stearate, 0.1% Goodrite 3114, and 0.1% colorant
**Determined using Hunter Color Difference Meter and Cielab conversions to gray scale of 1.0–5.0, with 5.0 indicating no fading.

TABLE 9
COMPARATIVE LIGHTFASTNESS DATA POLYPROPYLENE HOMOPOLYMER*

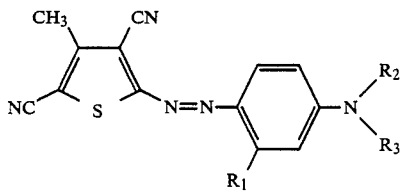

| | | Lightfastness Rating** | | |
|---|---|---|---|---|
| Entry # | R$_1$ | R$_3$R$_4$ 20 HRS | 60 HRS | 120 HRS |
| 1 | CH$_3$ | 10EO  3.5 | — | — |
| 2 | Cl | 10EO  — | 2.4 | 0.3 |
| 3 | CF$_3$ | 10EO  — | 4.0 | 3.3 |

*Polypropylene homopolymer base formulation: 0.1% calcium stearate, 0.1% Goodrite 3114, and 0.1% colorant
**Determined using Hunter color difference meter and Cielab conversions to gray scale of 1.0–5.0, with 5.0 indicating no fading.

TABLE 10
COMPARATIVE LIGHTFASTNESS DATA FOR POLYESTER FABRIC

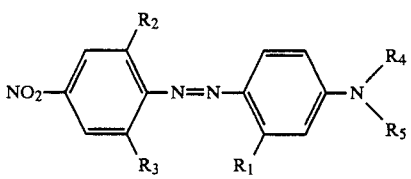

| | | | | | Light Fastness Rating* |
|---|---|---|---|---|---|
| Entry # | R$_1$ | R$_2$ | R$_3$ | R$_4$R$_5$ | 20 HRS. |
| 1 | H | Cl | H | 10EO | 2.5 |
| 2 | CH$_3$ | Cl | H | 10EO | 3.0 |
| 3 | CF$_3$ | Cl | H | 10EO | 4.0 |
| 4 | H | Cl | Cl | 10EO | 3.0 |
| 5 | CF$_3$ | Cl | Cl | 10EO | 4.5 |
| 6 | CH$_3$ | H | H | 10EO | 3.0 |
| 7 | Cl | H | H | 10EO | 3.5 |
| 8 | CF$_3$ | H | H | 10EO | 4.0 |
| 9 | H | CH | H | 10EO | 2.0 |
| 10 | CH$_3$ | CN | H | 10EO | 3.5 |
| 11 | CF$_3$ | CN | H | 10EO | 4.0 |

*Determined using Hunter color difference meter and Cielab conversions to gray scale of 1.0–5.0, with 5.0 indicating no fading.

As may be observed from a comparison of the trifluoromethylaniline colorants in Tables 6–10, they are very useful both in thermoplastic compositions and polyester fabric compositions. Moreover, Tables 8 and 9 for polypropylene and Table 10 for polyester fabrics illustrates improved properties of lightfastness for the compounds of this invention. In addition, the exhaustion rates are also improved for the polyester fabric compositions (table 7). Finally, polypropylene data of Table 6 also shows improved non-extractability of these novel colorants.

Having described the present invention in detail it is obvious that one skilled in the art will be able to make variations and modifications thereto without departing from the scope of the present invention. Accordingly, the scope of the present invention should be determined only by the claims appended hereto.

What is claimed is:

1. A colored thermoplastic resin composition which comprises a thermoplastic resin and a polyalkyleneoxy-trifluoromethyl aniline colorant incorporated into said thermoplastic resin while said resin is in the plasticized or molten state in an amount sufficient to provide coloration to said thermoplastic resin, said colorant having the formula:

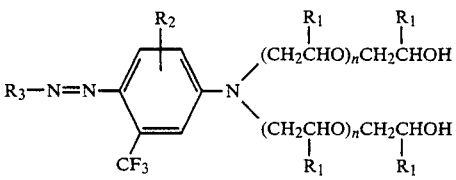

wherein R$_1$ is selected from H or CH$_3$; R$_2$ is H, CF$_3$, lower alkyl containing from 1 to 9 carbon atoms, Cl or Br; R$_3$ is aromatic or heteroaromatic, and n is an integer from 6 to about 75.

2. A colored resin composition according to claim 1 wherein said resin is selected from polyolefin polymer and copolymers.

3. A colored resin composition according to claim 2 wherein R$_3$ is selected from: 2-chloro-4-methylsulfonylphenyl, 2,6-dichloro-4-nitrophenyl, 3,5-dicyano-4-methylthiophenyl, 2-cyano-4-nitrophenyl, 2-chloro-4-nitrophenyl, 4-chlorobenzothiazolyl, 4-methylbenzothiazolyl, 2-cyano-4-nitro-6-bromo-phenyl, 4-phenylthiadiazolyl, 2,6-dicyano-4-nitrophenyl, 2,6-dichlorophenyl, 4-nitrophenyl, N,N-bis-hydroxyethylfulfonamidophenyl, 3,5-dicarboethoxy-4-methylthiophenyl, 3,5-dicarbomethoxy-4-methylthiophenyl, 3-carboethoxy-4-methyl-5-cyanothiophenyl, 3-carbomethoxy-4-methyl-5-cyanothiophenyl, 3-cyano-4,5,tetramethylenethiophenyl, 3-carbomethoxy-5-isobutyrylthiophenyl, 3-carboethoxy-4-methyl-5-phenylamidothiophenyl, 3-cyano-4-methyl-5-acetylthiophenyl, 5-ethylthiothiadiazolyl, thiazolyl, 4-methylthiazolyl, 3-carboethoxy-4-methyl-5-cyanothiophenyl, 2-trifluoromethyl-4-nitrophenyl, 2-chloro-5-nitrophenyl, 2-chloro-5-trifluoromethylphenyl, 2-trifluoromethyl-4-chlorophenyl, 2-trifluoromethylphenyl, 4-trifluoromethylphenyl, and 3,5-bistrifluoromethylphenyl.

4. A colored resin composition according to claim 3 wherein R$_2$ is H.

5. A colored resin composition according to claim 2 wherein n is an integer from 10 to about 75.

* * * * *